(12) United States Patent
Hirosawa et al.

(10) Patent No.: US 6,418,465 B1
(45) Date of Patent: Jul. 9, 2002

(54) MESSAGING PROCESSING SYSTEM AND METHOD

(75) Inventors: Toshio Hirosawa, Machida; Tsutomu Ito, Tsukui-gun; Minoru Hidaka, Kodaira; Takehiro Morishige, Hachioji; Yutaka Nara, Yokohama; Atsushi Ueoka, Kokubunji, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/256,176

(22) Filed: Feb. 24, 1999

(30) Foreign Application Priority Data

Feb. 27, 1998 (JP) .......................... 10-046732

(51) Int. Cl.7 .................................. H04J 3/26
(52) U.S. Cl. ...................... 709/206; 709/203; 370/94.1
(58) Field of Search ................. 709/200, 201, 709/203, 206, 219, 224, 220; 370/94.1, 100

(56) References Cited

U.S. PATENT DOCUMENTS

| | | | | |
|---|---|---|---|---|
| 5,479,408 A | * | 12/1995 | Will .......................... | 370/94.1 |
| 5,557,723 A | * | 9/1996 | Holt et al. .................. | 709/201 |
| 5,632,018 A | * | 5/1997 | Otorii ......................... | 709/203 |
| 5,765,170 A | * | 6/1998 | Morikawa ................... | 707/200 |
| 5,958,007 A | * | 9/1999 | Lee et al. ................... | 709/219 |

FOREIGN PATENT DOCUMENTS

| | | |
|---|---|---|
| JP | 818717 | 1/1996 |
| JP | 964907 | 3/1997 |

OTHER PUBLICATIONS

"Lotus cc: Mail" Planning and Instruction Guide Release 8.1, pp 9–26, 1997.
A. Dumas, Programming WinSock, pp 44–53, 1995.

* cited by examiner

Primary Examiner—Ayaz Sheikh
Assistant Examiner—Khanh Quang Dinh
(74) Attorney, Agent, or Firm—Antonelli, Terry, Stout & Kraus, LLP

(57) ABSTRACT

A messaging processing system which includes a process control table for storing the control information of a process corresponding to access terminals connected through a public network in a form that identifiers indicating the 'priority processing' are added to the control information, and a scheduler that executes the process having the identifier indicating the 'priority processing' in preference to the other processes during the dispatching processing of the process.

3 Claims, 4 Drawing Sheets

MESSAGING PROCESSING SYSTEM AND METHOD

BACKGROUND OF THE INVENTION

The present invention relates to a message processing system, specifically to a system that, when access terminals for accessing the messaging processing system are connected through a public network, secures a processing to the access terminals, and a method of the same.

In recent years, owing to the widespread use of Personal Computers (PC) and Local Area Networks (LAN), as represented by the electronic mail system, the messaging processing system using a LAN as the network path has been popularized.

As a typical electronic mail system with PC terminals, there are the cc: Mail from Lotus corp. and the MS mail from Microsoft corp. and the like. In these systems, using PC terminals through a LAN as access terminals, messages, namely, electronic mails are interchanged between the access terminals through a messaging server. The "cc: Mail users guide" from Lotus corp. describes the method of interchanging messages between PC terminals.

In the messaging processing system represented by the electronic mail system, the messaging server generates a process (a processing program to be executed) for each client access terminal before the messaging processing, and thereafter access terminals begin to communicate by a socket communication between, for example, UNIX and Windows, or Windows and Windows on the terminals.

In the socket communication, once a session is established with the server, the access terminal connected to the server through the LAN is able to communicate with the server whenever a data communication is needed. The details of the socket communication is described in the following published materials.

<1>"Network Programming by Winsock": published by ASCII publishing department
<2>"Programming Winsock" written by Dumas : published by Sams A normal messaging processing system makes possible message communication between PC terminals or PDA (Personal Data Assistant) terminals connected to the messaging processing system through a public line, other than message communication between the foregoing PC terminals connected through the LAN. In the prior art system, the messaging server does not distinguish a process corresponding to a message processing request received through the LAN from a process corresponding to a message processing request received through the public line, that is, the messaging server operates to process these two processes on the equal basis, and therefore, the system has the advantage that equal services are provided to users, viewing from the access terminals.

On the other hand, the generalization of the electronic mail system has increased the demand for requesting an access to the messaging server from any place at any time, using an access terminal represented by the PC terminal. Specially, the access through a public network becomes indispensable, where a user is on the business trip or outside the office. When a PC terminal interchanges a message with the messaging processing system through a public network, the transfer rate of the message becomes extremely lowered, compared to a case in which an access is made to the messaging processing system from a terminal connected to a LAN, and in addition the waiting time (called as the Think Time) for a message input from the PC terminal becomes elongated. As a result, there arises a problem that the service to the access terminal becomes lowered in quality, where a user employs the messaging server through the public network. Thus, the service is expected to be more than the equal level to what the terminal connected to the LAN receives.

SUMMARY OF THE INVENTION

Accordingly, it is an object of the present invention to provide a messaging processing system comprising a messaging server and access terminals, in which a service processing to an access terminal through a public network is executed preferentially, and a messaging processing method of the same.

In order to accomplish the foregoing object, the messaging processing system of the invention provides a process corresponding to an access terminal coupled through a public network with an identifier indicating the "priority processing" in a process control table, so as to execute the priority processing as for the process corresponding to the access terminal through the public network. Further, the messaging server is made to preferentially select a process having the identifier indicating the "priority processing", when the system determines a process to be executed referring to the process control table, namely, when dispatching a process.

In the conventional technique, among processes waiting for message inputs from access terminals is released a process which has received no message input from the access terminals after elapsing of a specific wait time. However in the system of this invention, a dispatching processing unit redispatches the processes which have the identifier indicating the "priority processing" more frequently by a specific frequency than the other processes so that the release of the process with the above identifiers is delayed than the other processes.

Further, when a message is inputted in a wait state for a message input from the access terminals, a process is executed in preference to the other processes if the process has the priority processing identifier.

As an alternative to solve the foregoing problem, in addition to the messaging server, the messaging processing system of the invention is provided with a communication control server dedicated to communicating with access terminals through a public network, and a first process and a second process both of which correspond to the same access terminal are generated in the communication control server and the messaging server, respectively, so as to execute a socket communication between the first process and the second process.

The second process is not released until the first process is released, and as to the first process, the waiting monitoring time for a message input from the access terminals is set significantly long; and thereby, the second process in the messaging server is serviced equally without being discriminated from the other processes corresponding to PC terminals connected through a LAN. As a result, the service to the access terminals connected through the public network is executed preferentially.

DESCRIPTION OF THE PREFERRED EMBODIMENT

The embodiment of a messaging processing system of the invention will now be described with reference to the accompanying drawings.

Figure 1:
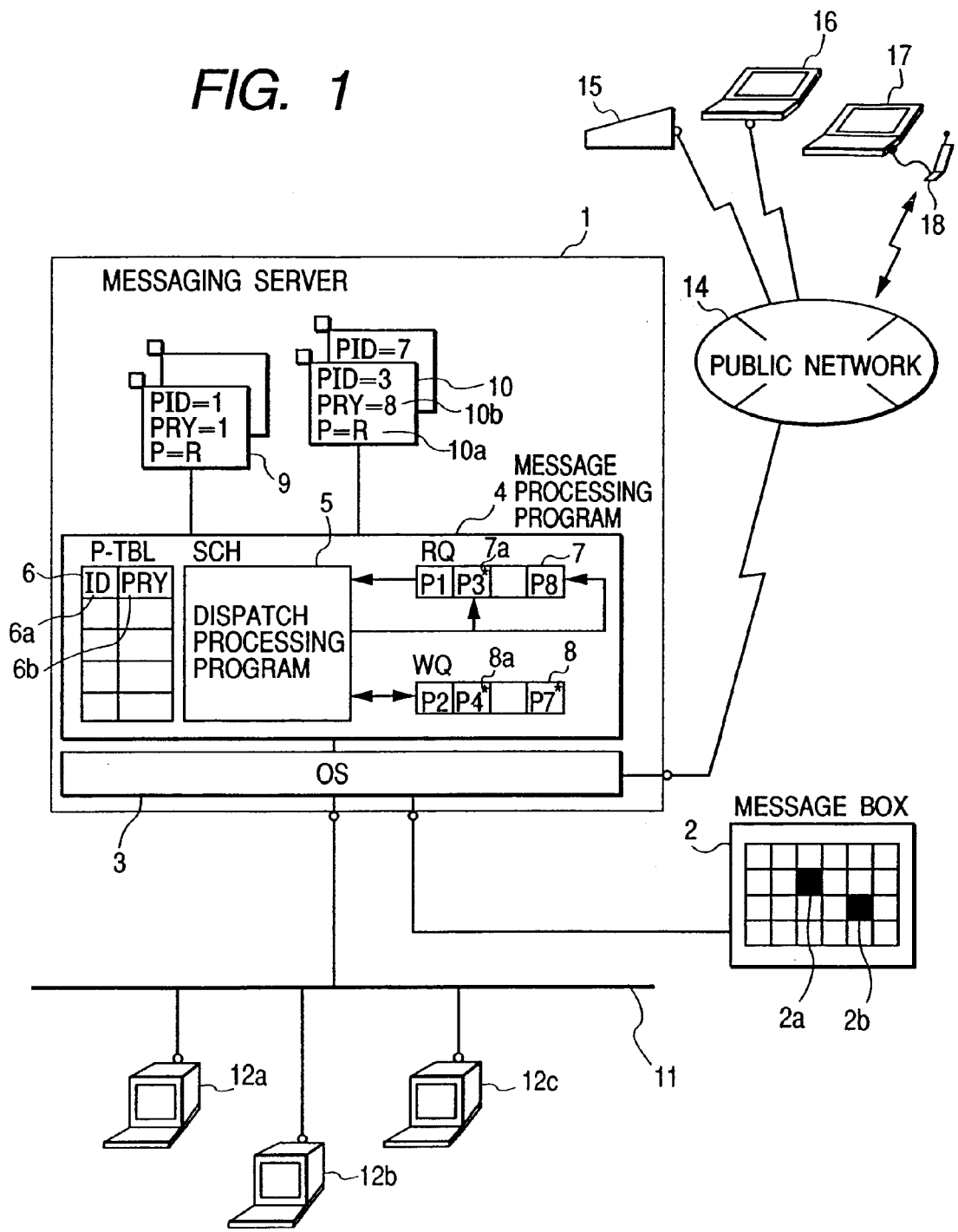
FIG. 1 is a chart to illustrate one embodiment of a messaging processing system of the invention.

FIG. 1 illustrates one embodiment of the messaging processing system of the invention.

The messaging processing system of the invention comprises two main units, that is, a messaging server 1 and a message box 2, through which messages are interchanged. Access terminals 12a through 12c, for example, access the messaging server 1 through a LAN 11. The messaging server 1 is controlled by an operating system(OS) 3. Access terminals 15 through 17 access the messaging server 1 through a public network 14. A portable PC 17, for example, accesses the public network 14 using a portable telephone 18, and it accesses the messaging server 1 through the public network 14.

When one of these terminals accesses the messaging server 1, the messaging server 1 generates a new control table 9 or 10 for the process corresponding to the access terminal. The control table 9 is prepared to control a process corresponding to access terminals connected through the LAN, and the control table 10 is prepared to control a process corresponding to access terminals connected through the public network. Based on these control tables 9 and 10, input messages (2a, 2b) from the source access terminal are stored in the message box 2, and the messages stored in the message box 2 are transmitted to the destination access terminals. Here, a conventional PC, Workstation (WS) or PDA may be applicable as the above access terminal if communication function is equipped thereto.

The messaging processing system of the invention is characterized in that the messaging server 1 is provided with a storage for storing identifiers 6b, 7a, 8a, 10a or 10b to indicate the priority processing request, and priority processing control function 5.

The storage area for the identifiers to indicate the priority processing request may be any one of the following:

(1) A priority (PRY) field 6b in the priority table (P-TBL) 6, (2) A mark bit 7a or 8a assigned to each entry inside the ready queue (RQ) 7 or the wait queue (WQ) 8, (3) An indication field of process type 10a in the control table 10 corresponding to each process, and (4) An indication field of process priority (PRY) 10b in the control table 10 corresponding to each process.

In FIG.1, "ID" 6a in the priority table(P-TBL) 6 represents the process number, which is equivalent to the number of the process identifier (PID) in the control table 9, 10 corresponding to each process. In the same manner, the priority ("PRY") 6b is equivalent to the number of the process priority ("PRY") 10b.

When any one of the access terminals 15~17 through the public network is connected to the messaging server, the identifier to indicate that the process is a priority process is automatically stored by any one of the storage means from the foregoing (1) through (4). The setting of P=R to the process type 10a, for example, will recognize that the process corresponds to an access terminal through the public network.

And, the entry in the queue 7 or 8 assigned with the mark 7a or 8a will render the process to be executed preferentially.

Figure 2:
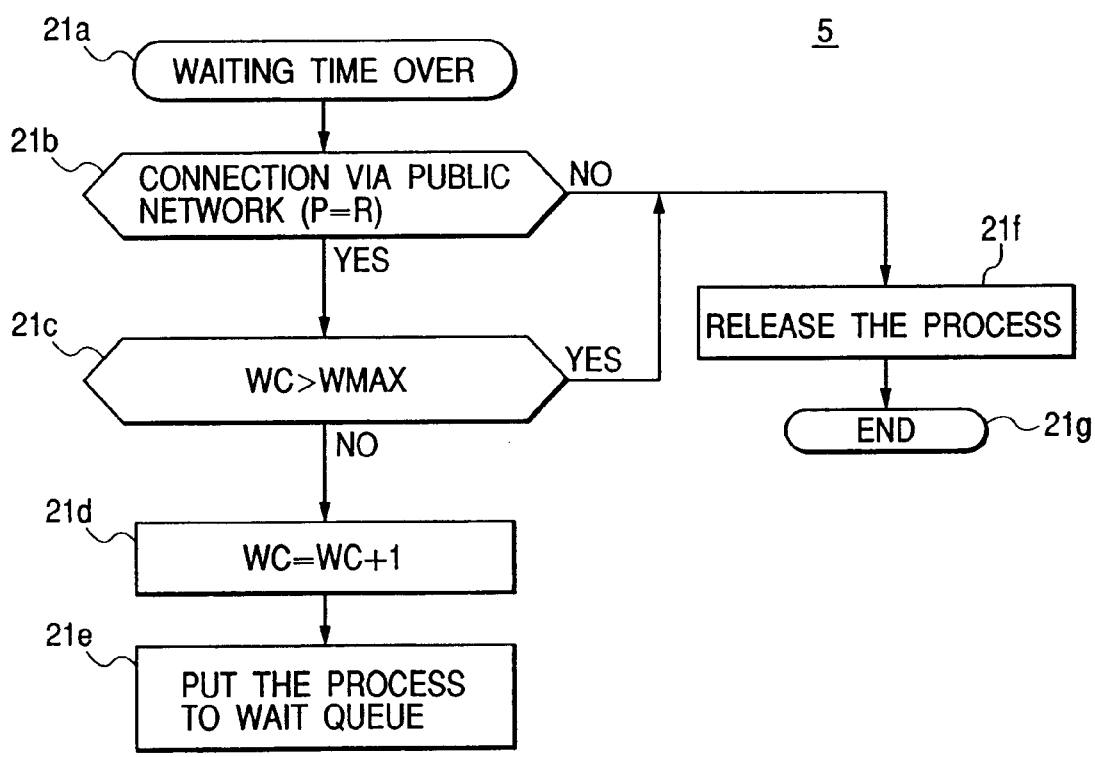
FIG. 2 is a flow chart to illustrate a processing procedure when the waiting time exceeds a preset time during waiting for a message input from an access terminal in a dispatching processing program (SCH)

FIG. 2 illustrates a processing flow when the waiting time for a message input from an access terminal reaches the time-out in the dispatching processing program (SCH) 5 that executes the priority schedule processing, which is the feature of this invention.

If it is detected at the first step 21a that the waiting time for a message input reaches the time-out in one process, the priority schedule processing executes steps 21b through 21g. The determination step 21b determines whether the access terminal corresponding to the time-out process that has reached the time-out is an access terminal through the public network. This determination only needs to check whether the value of the process type (P) 10a is P=R. However, the determination may be performed by checking the other parameters mentioned in the foregoing (1) through (4). In the determination step 21b, if the value is P≠R for the time-out process and the priority processing is determined unnecessary, the process is released at the step 21f.

If the time-out process is determined as an object of the priority processing, the determination step 21c determines whether the wait frequency (WC) exceeds the maximum value WMAX. The maximum value WMAX can be set freely in the range from two times to ten times of the normal process which the priority processing is unnecessary. If WC exceeds WMAX, the time-out process is released at the step 21f. If the time-out process is determined as the priority processing object and the wait frequency WC does not exceed the maximum value WMAX, the wait frequency WC is incremented by 1 at the step 21d, and thereafter, the time-out process is registered in the wait queue (WQ) 8 at the step 21e.

Owing to the foregoing control, it is possible to secure n-times waiting time compared to the waiting time for an access terminal through the general LAN and provide a preferential service, as to an access terminal through the public network, even if it exceeds a specific waiting time for a message input.

Figure 3:
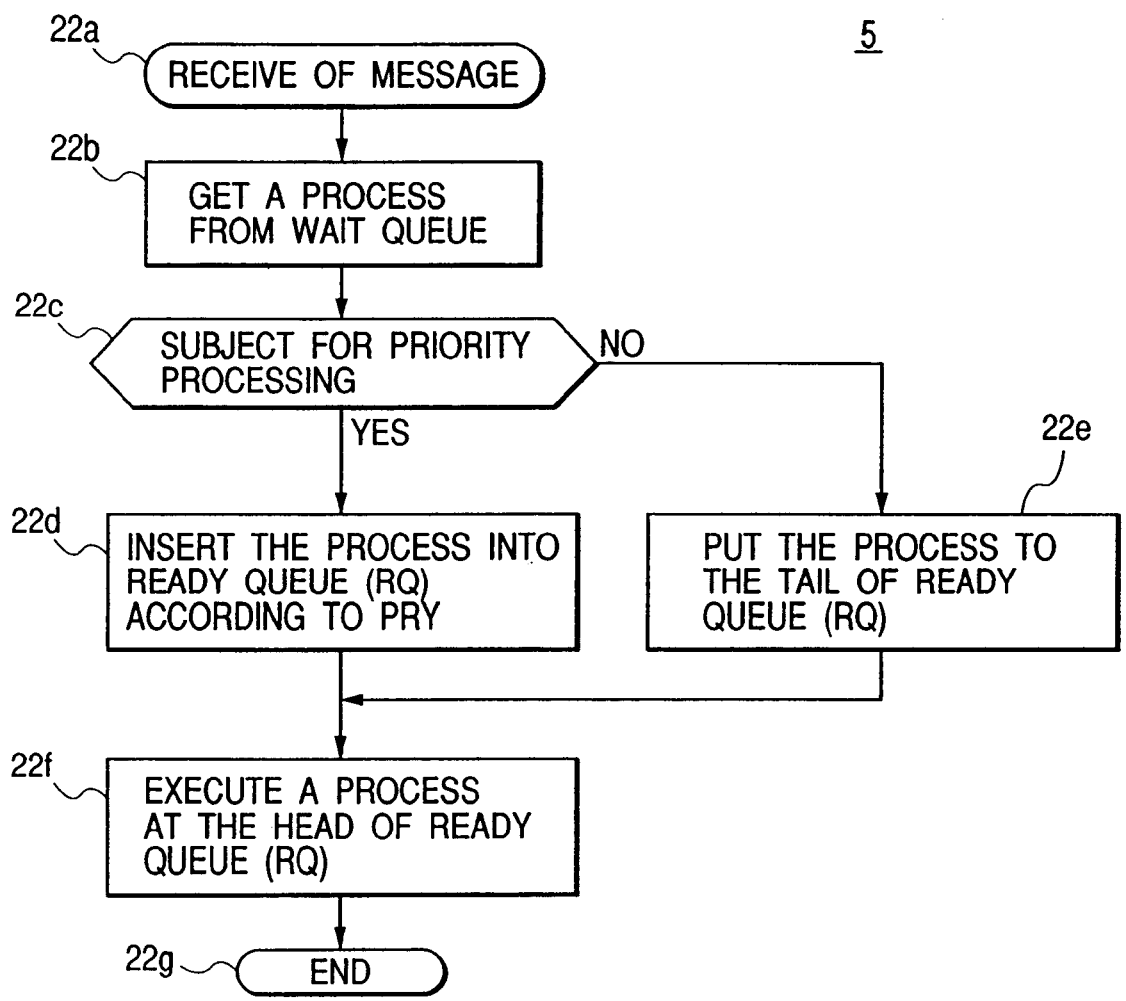
FIG. 3 is a flow chart to illustrate a dispatching processing procedure of each process during a message input in the dispatching processing program (SCH)

Next, the processing procedure when a message is inputted from an access terminal will be described. FIG. 3 illustrates the dispatching processing procedure of a process during a message input in the dispatching processing program 5 of the invention.

Such a process that turned into a waiting state of a message input from an access terminal is transferred to the wait queue (WQ) 8 from the ready queue (RQ) 7. When a message is inputted from an access terminal, the process corresponding to the access terminal is transferred to the ready queue (RQ) to be ready for run, according to the following procedure.

First at step 22b, the corresponding process is taken out from the wait queue (WQ) 8, and the determination step 22c checks whether the corresponding process is to be treated as the object of the priority processing. Here, the discrimination as to the priority processing object is carried out on the basis of the foregoing (1) through (4). If the process is not the priority processing object, the process is put on the tail end of the ready queue (RQ) 7 at step 22e.

If the process is the priority processing object, the process is inserted into the ready queue (RQ) 7 at step 22d. At this moment, referring to the priority (PRY) 10a or (PRY) 6b, the process with a larger value of the PRY, namely, the process with a higher priority is put forwarder in the ready queue (RQ) 7. Next, the leading process in the ready queue (RQ) 7 is executed at step 22f.

Thus, the priority service to access terminals through the public network can be carried out preferentially by the foregoing priority processing control according to the invention.

Figure 4:
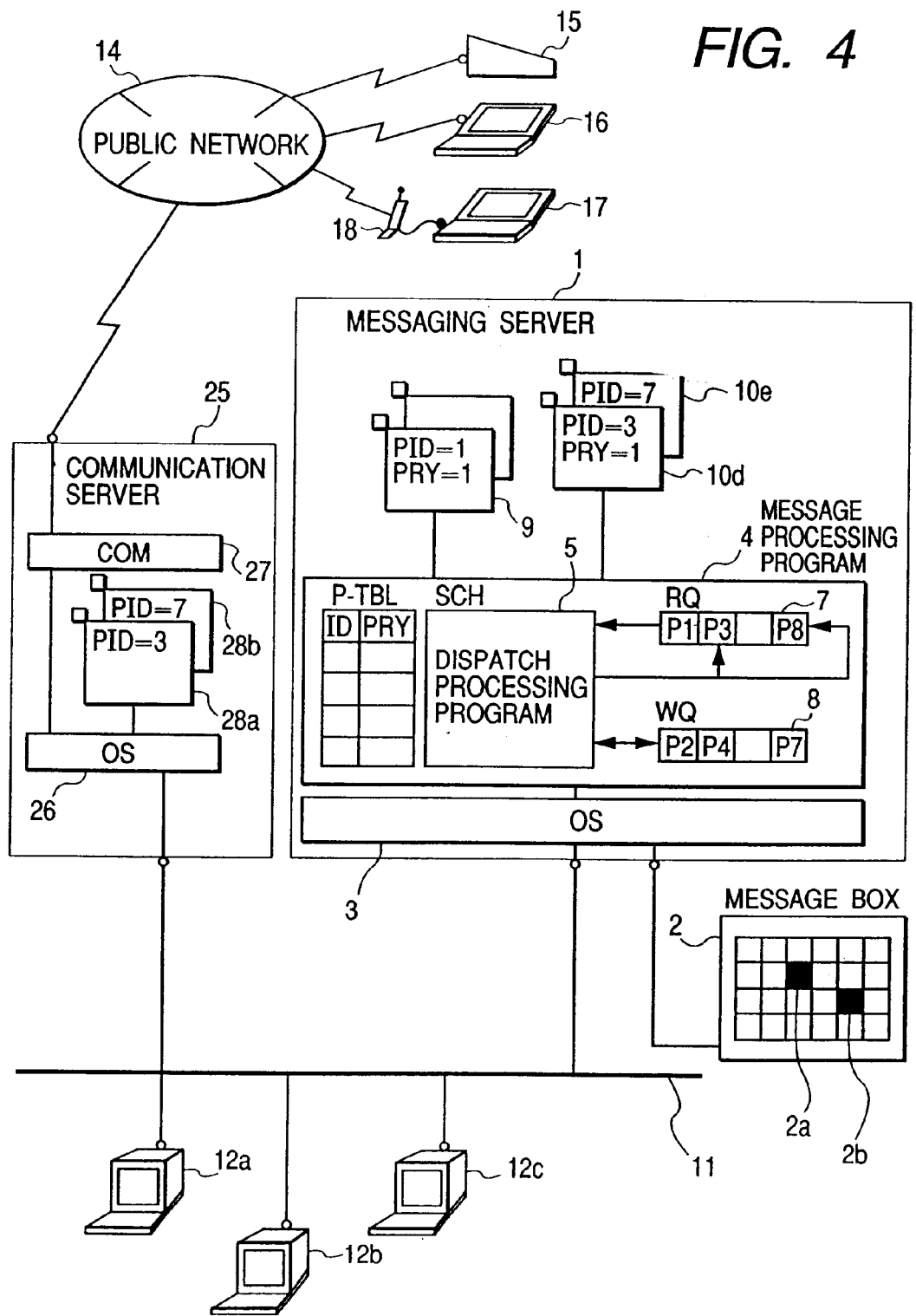
FIG. 4 is a chart to illustrate the other embodiment of the messaging processing system of the invention.

FIG. 4 illustrates the other embodiment of the messaging processing system of the invention. The difference from FIG. 1 lies in that FIG. 4 is provided with a communication control server 25 dedicated to communicating with access terminals through a public network. In FIG. 4, the components having the same functions as those mentioned in FIG. 1 are given the same symbols. The communication control server 25 is connected to the messaging server 1 through the LAN 11, and performs the socket communication with the messaging server 1 under the control of an operating system (OS) 26.

A communication program 27 in the communication control server 25 interchanges messages with the access terminals 15~17 connected through the public network. When an access terminal is connected, a control table for a new process 28a or 28b corresponding to the access terminal is generated. The process 28a, for example, corresponds to the access terminal 15, and the process 28b corresponds to the portable PC 1 terminal 17. At this moment, according to the well-known socket communication technique, new processes 10d or 10e corresponding to the new processes 28a or 28b is generated in the messaging server 1. The process 10d is the process exited by the process 28a in the communication control server 25. The process 10e is the process exited by the process 28b.

These processes 10d and 10e in the message server 1 are processed in the same manner as the process 9 corresponding to the access terminal 12a connected to the LAN 11. These processes 10d and 10e are not released, as long as the processes 28a and 28b in the communication control server 25 are not released. Therefore, as long as the access terminals: 15~17 do not show the log-off request, the conventional problem accompanied with the electronic mail communication through the public network can be solved by employing the processing procedure (not illustrated) which does not release the processes 28a, 28b in the communication control server 25.

The messaging processing system of the invention can be applied to the electronic mail system that has been widespread rapidly in recent years. Further, in case that the device 12a connected to the LAN 11 is a server device, the messaging processing system of the invention provides the control means that administer the relay of messages between the servers, or between the server and the client PC 15.

According to the invention, since the service processing to access terminals connected through a public network can be made preferentially, if used on the business trip or from outside of the office, the messaging processing system can provide the service quality more than equal to that when used from an access terminal connected through a conventional LAN.

Further, the messaging processing system of the invention is provided with the relay function of messages, even while communications are being made between the servers, or between the server and the client PC; and therefore, even from an access terminal through the public network, the access terminal is able to carry out a satisfactory role as the client terminal.

What is claimed is:

1. A messaging processing system that administers a store and a forward processing of messages interchanged between a plurality of access terminals, the system comprising:

storage means that store a control information of a process corresponding to an access terminal;

control means for adding an identifier indicating that a message processing request from a specific access terminal is processed in preference to the other access terminals to a control information area of the process corresponding to the specific access terminal in the storage means; and message process control means that process the message from the specific access terminal corresponding to the process with the identifier added, in preference to messages from the other access terminal, wherein the message processing control means include means to repeat an operation that brings the specific process again into a wait state of a message input until the repetitive operation reaches a specific frequency, when a wait time for the message input of the process corresponding to the specific access terminal exceeds a certain pre-assigned time.

2. A messaging processing system according to claim 1, wherein the control means include means to automatically add the identifier to a process corresponding to an access terminal connected through a public network.

3. A messaging processing system according to claim 1, wherein the identifier is a priority number used by a dispatching processing program.

* * * * *